United States Patent
Igarashi (10) Patent No.: US 10,519,941 B2
(45) Date of Patent: Dec. 31, 2019

(54) FLOW CONTROL APPARATUS

(71) Applicant: Surpass Industry Co., Ltd., Gyoda-shi, Saitama (JP)

(72) Inventor: Hiroki Igarashi, Gyoda (JP)

(73) Assignee: Surpass Industry Co., Ltd., Gyoda-shi, Saitama (JP)

(*) Notice: Subject to any disclaimer, the term of this patent is extended or adjusted under 35 U.S.C. 154(b) by 131 days.

(21) Appl. No.: 15/054,466

(22) Filed: Feb. 26, 2016

(65) Prior Publication Data

US 2016/0265519 A1    Sep. 15, 2016

(30) Foreign Application Priority Data

Mar. 11, 2015  (JP) .................................. 2015-048199

(51) Int. Cl.
*F04B 11/00* (2006.01)
*G05D 7/06* (2006.01)
(Continued)

(52) U.S. Cl.
CPC ...... *F04B 11/0091* (2013.01); *F04B 43/0072* (2013.01); *F04B 43/08* (2013.01); *F04B 49/22* (2013.01); *G05D 7/0676* (2013.01)

(58) Field of Classification Search
CPC .. F04B 11/00; F04B 11/0091; F04B 43/0072; F04B 49/22; F04B 39/0055; F04B 43/08; Y10T 137/882; G05D 7/0676; F15B 13/04

See application file for complete search history.

(56) References Cited

U.S. PATENT DOCUMENTS 3,525,357 A * 8/1970 Koreski .................. F04B 43/08
                                                            137/512.15
3,837,363 A * 9/1974 Meronek ................ A01G 25/16
                                                            138/45
(Continued)

FOREIGN PATENT DOCUMENTS

JP    54-146411 U1    10/1979
JP    58-076892 U1    5/1983
(Continued)

OTHER PUBLICATIONS

Japanese Office Action dated Dec. 18, 2018 in corresponding application 2015-048199.
(Continued)

*Primary Examiner* — Kenneth J Hansen
(74) *Attorney, Agent, or Firm* — Muncy, Geissler, Olds & Lowe, P.C.

(57) ABSTRACT

Provided is a flow control apparatus including a flow passage having a tube pump placed therein, a flow meter placed downstream of the tube pump in the flow direction, the flow meter measuring a flow rate of liquid passing the flow passage, and a flow controller controlling a liquid output of the tube pump so that the flow rate measured by the flow meter matches a target flow rate. The flow passage includes a straight tubular second flow passage that is flexible to be elastically deformed by the pressure of the liquid, the second flow passage being placed downstream of the tube pump in the flow direction, and a third flow passage at which a cross-sectional flow area of the flow passage in a plane orthogonal to the flow direction is smallest, the third flow passage being placed downstream of the second flow passage in the flow direction.

6 Claims, 7 Drawing Sheets

(51) Int. Cl.
F04B 43/08 (2006.01)
F04B 43/00 (2006.01)
F04B 49/22 (2006.01)

(56) References Cited

U.S. PATENT DOCUMENTS

| | | | | |
|---|---|---|---|---|
| 5,316,444 | A | * | 5/1994 | Wicnienski ............. F04B 43/12 417/17 |
| 5,475,976 | A | * | 12/1995 | Phillips ................... F16L 55/02 181/252 |
| 2004/0107996 | A1 | * | 6/2004 | Crocker ............... G05D 7/0694 137/487.5 |
| 2012/0282111 | A1 | * | 11/2012 | Nip ........................ F04B 49/06 417/48 |

FOREIGN PATENT DOCUMENTS

| | | | |
|---|---|---|---|
| JP | H08303679 | A | 11/1996 |
| JP | 2000-205201 | A | 7/2000 |
| JP | 2006-002659 | A | 1/2006 |
| JP | 2007270689 | A | 10/2007 |
| JP | 5677660 | B1 | 7/2015 |

OTHER PUBLICATIONS

Japanese Office Action dated Jul. 2, 2019 in corresponding Japanese application 2015-048199.

* cited by examiner

FLOW CONTROL APPARATUS

CROSS-REFERENCE TO RELATED APPLICATIONS

This application is based on Japanese Patent Application No. 2015-048199, the contents of which are incorporated herein by reference in its entirety.

TECHNICAL FIELD

The present disclosure relates to a flow control apparatus that controls the flow rate of liquid being intermittently pumped by a pump.

BACKGROUND ART

A tube pump is conventionally known that pumps liquid in a tube formed from an elastic member by intermittently compressing the tube with a plurality of rollers. Liquid output of the tube pump changes with the rotational speed of the rotor to which the rollers are attached.

The flow rate of the liquid being pumped intermittently by the tube pump may be controlled by measuring the flow rate of the liquid with a flow meter provided at a flow passage downstream of the tube pump and controlling the rotational speed of the rotor of the tube pump in accordance with the measured flow rate.

The flow meter, however, cannot measure the flow rate of the liquid correctly when the liquid being pumped intermittently by the tube pump is pulsating. Accordingly, the flow rate of the liquid being pumped by the tube pump cannot be controlled appropriately. The liquid is likely to pulsate greatly particularly when the rotor of the tube pump turns at a low speed and the liquid output of the tube pump is small.

As a device for suppressing the pulsations of the liquid being pumped by the pump, a damper is known that maintains the pressure balance between an air chamber and a liquid chamber provided therein to suppress the pulsations of the liquid being guided into the liquid chamber (see Japanese Unexamined Patent Application, Publication No. 2000-205201, for example).

CITATION LIST

Patent Literature

{PTL 1}
Japanese Unexamined Patent Application, Publication No. 2000-205201

SUMMARY

Technical Problem

Liquid with reduced pulsations can be guided into the flow meter by providing a damper disclosed in Japanese Unexamined Patent Application, Publication No. 2000-205201 in a flow passage downstream of the tube pump.

The damper disclosed in Patent Literature 1, however, is provided with a liquid chamber accommodating a certain quantity of liquid, and thus the damper has a space that retains non-flowing liquid (so-called, a dead volume) in the liquid chamber. As a result, the purity of the liquid might not be properly maintained due to, for example, microbial proliferation in liquid residing in the space.

In addition, the damper disclosed in Japanese Unexamined Patent Application, Publication No. 2000-205201, which is provided with the air chamber and the liquid chamber, is relatively complex and voluminous. Accordingly, the overall apparatus that controls the flow rate of liquid becomes complex and large.

The present disclosure has been made in view of the circumstances, and aims to provide a flow control apparatus that can suppress the pulsations of liquid being pumped intermittently by a pump without having any space for retaining non-flowing liquid and control the flow rate appropriately.

Solution to Problem

In order to solve the foregoing problem, the following solutions have been adopted in the present disclosure.

A flow control apparatus according to an aspect of the present disclosure is a flow control apparatus for controlling the flow rate of liquid being pumped intermittently by a pump, including a flow passage extending in a flow direction from an inlet end toward an outlet end, the pump being placed on the flow passage, a flow meter placed downstream of the pump in the flow direction, the flow meter measuring the flow rate of liquid flowing through the flow passage, and a control unit for controlling a liquid output of the pump so that the flow rate measured by the flow meter matches a target flow rate. In the apparatus, the flow passage includes a straight tubular flexible flow passage that is flexible to be elastically deformed by the pressure of liquid, the flexible flow passage being placed downstream of the pump in the flow direction, and a reduced diameter portion at which a cross-sectional flow area of the flow passage in a plane orthogonal to the flow direction is smallest, the reduced diameter portion being placed downstream of the flexible flow passage in the flow direction.

According to a flow control apparatus in accordance with an aspect of the present disclosure, the straight tubular flexible flow passage is placed downstream of the pump in the flow direction, and the reduced diameter portion having the smallest cross-sectional flow area in the flow passage is placed downstream of the flexible flow passage. The reduced diameter portion has the highest pipe resistance in the flow passage, and accordingly the provision of the reduced diameter portion downstream of the flexible flow passage reduces the dynamic pressure and increases the static pressure of the liquid flowing through the flexible flow passage as compared with the case where the reduced diameter portion is not provided downstream of the flexible flow passage.

According to a flow control apparatus in accordance with an aspect of the present disclosure, the straight tubular flexible flow passage is flexible to be changed in its cross-sectional flow area by the pressure of the liquid. The flexible flow passage, therefore, is elastically deformed when liquid pulsations further increase the static pressure of the liquid inside the flexible flow passage, thereby suppressing transmission of the liquid pulsations downstream thereof.

Also, according to a flow control apparatus in accordance with an aspect of the present disclosure, the straight tubular flexible flow passage can suppress the liquid pulsations, and thus this eliminates the need for a device having a space for retaining non-flowing liquid such as a damper that has a liquid chamber for suppressing liquid pulsations.

Thus, according to a flow control apparatus in accordance with an aspect of the present disclosure, there can be provided a flow control apparatus that can suppress the pulsations of the liquid being pumped intermittently by the pump without having any space for retaining non-flowing liquid and control the flow rate appropriately.

A flow control apparatus in accordance with an aspect of the present disclosure may be configured to include a check valve placed downstream of the pump in the flow direction.

According to the configuration, the liquid is prevented from being guided in the direction opposite to the flow direction from the inlet end toward the outlet end even when the liquid being pumped intermittently by the pump is pulsating greatly.

In a flow control apparatus in accordance with an aspect of the present disclosure, the pump may be a tube pump that pumps liquid in a tube formed from an elastic material by intermittently compressing the tube.

With this configuration, a flow control apparatus can be provided that can suppress the pulsations of the liquid being pumped intermittently by the tube pump and control the flow rate appropriately.

In a flow control apparatus in accordance with an aspect of the present disclosure, the reduced diameter portion may be configured as a straight tubular flow passage whose cross-sectional flow area in a plane orthogonal to the flow direction is constant.

With this configuration, the reduced diameter portion can be a straight tubular flow passage with a relatively simple configuration.

In a flow control apparatus in accordance with an aspect of the present disclosure, the flow meter may be configured to be placed downstream of the reduced diameter portion in the flow direction.

With this configuration, the liquid whose pulsations are suppressed by the flexible flow passage placed upstream of the reduced diameter portion and further, reliably suppressed after passing through the reduced diameter portion can be supplied to the flow meter.

In a flow control apparatus in accordance with an aspect of the present disclosure, the cross-sectional flow area of the flow passage in a plane orthogonal to the flow direction may be largest at the flexible flow passage.

This can ensure that a sufficient amount of liquid is accommodated in the flexible flow passage, thereby more reliably suppressing the liquid pulsations.

In a flow control apparatus in accordance with an aspect of the present disclosure, the check valve may be a duckbill check valve.

With this configuration, the liquid is appropriately prevented from being guided in the direction opposite to the flow direction from the inlet end toward the outlet end even when the flow rate of the liquid being pumped by the pump is very low.

Advantageous Effects

According to the present disclosure, a flow control apparatus can be provided that can suppress pulsations of liquid being pumped intermittently by a pump without having any space for retaining non-flowing liquid and control the flow rate appropriately.

DESCRIPTION OF EMBODIMENTS

First Embodiment

Hereinafter, a flow control apparatus 100 of a first embodiment of the present disclosure will be described with reference to the drawings.

The flow control apparatus 100 of the embodiment controls the flow rate of liquid being pumped by a tube pump 20. The flow control apparatus 100 of the embodiment is suitable for controlling a very small amount of flow rate in the range of from 0.1 cc/min to 30 cc/min, for example.

Figure 1:
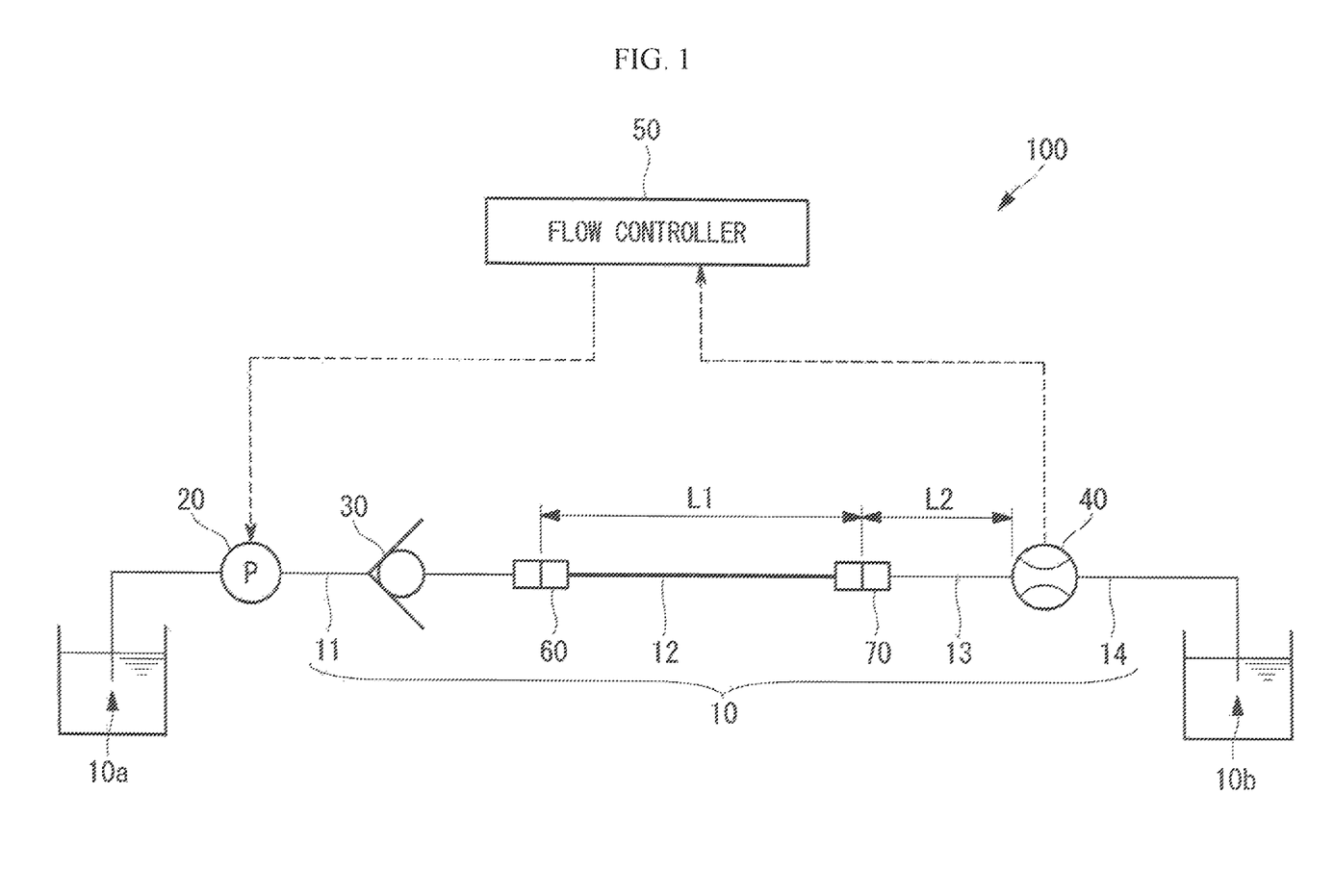
FIG. 1 shows the configuration of a flow control apparatus according to a first embodiment.

As shown in FIG. 1, the flow control apparatus 100 of the embodiment includes a flow passage 10 extending in a flow direction of from an inlet end 10a to an outlet end 10b, the tube pump 20 that pumps the liquid intermittently, a check valve 30 placed downstream of the tube pump 20 in the flow direction, a flow meter 40 that measures the flow rate of the liquid flowing in the flow passage 10, and a flow controller 50 (control unit) that controls liquid output of the tube pump 20.

The components of the flow control apparatus 100 of the embodiment will be described hereinafter.

The flow passage 10 is a tubular member extending in the flow direction from the inlet end 10a to the outlet end 10b and having the tube pump 20 placed in the vicinity of the inlet end 10a.

As shown in FIG. 1, the flow passage 10 includes a first flow passage 11, a second flow passage 12 (an elastic flow passage), a third flow passage 13 (a reduced diameter portion), and a fourth flow passage 14 that are connected one another in this order from upstream in the flow direction. The first flow passage 11 and the second flow passage 12 are coupled together by a joint 60 and the second flow passage 12 and the third flow passage 13 are coupled together by a joint 70.

The first to fourth flow passages 11 to 14 are straight tubular flow passages. Each of the flow passages has a constant inner diameter at any point in the flow direction of the liquid.

Here, when the inner diameters of the first to fourth flow passages 11 to 14 are respectively ID1, ID2, ID3, and ID4, they are in the following relationship of Equation (1).

$$ID3 < ID1 = ID2 = ID4 \qquad (1)$$

For specific values, ID1, ID2, and ID4 may be set to 2 mm, and ID3 may be set to 0.5 mm, for example.

When outer diameters of the first to fourth flow passages 11 to 14 are respectively OD1, OD2, OD3, and OD4, they are in the following relationship of Equation (2).

$$OD1 = OD3 = OD4 < OD2 \qquad (2)$$

For specific values, OD1, OD3, and OD4 may be set to 3 mm, and OD2 may be set to 4 mm, for example.

The first to fourth flow passages 11 to 14 are formed from a corrosion-resistant resin material. Of the four flow passages, the second flow passage 12 is formed from a flexible resin material (e.g., silicon rubber) that is flexible to be elastically deformed by the pressure of the liquid being pumped by the tube pump 20. On the other hand, the first flow passage 11, the third flow passage 13, and the fourth flow passage 14 are formed from a resin material more rigid than the second flow passage 12 (e.g., polytetrafluoroethylene (PTFE)).

When a length of the second flow passage 12 in the flow direction is L1 and a length of the third flow passage 13 in the flow direction is L2 as shown in FIG. 1, they are desirably set, for example, within the ranges in following Equations (3) and (4).

$$100\ mm \leq L1 \leq 500\ mm \tag{3}$$

$$50\ mm \leq L2 \leq 250\ mm \tag{4}$$

In addition, the lengths L1 and L2 are desirably set to satisfy the relationship of Equation (5).

$$L1 > L2 \tag{5}$$

Also, the lengths L1 and L2 are further desirably set to satisfy the relationship of Equation (6).

$$L1 \geq 2 \cdot L2 \tag{6}$$

The second flow passage 12 is flexible to be elastically deformed by the pressure of the liquid, and thus the longer length L1 provides more pulsation reducing effect. Note that the longer length L1 increases dimensions of the overall apparatus. The length L1 is therefore set within the range shown in Equation (3).

The third flow passage 13, which has the inner diameter ID3 that is smaller than the other flow passages, provides resistance effect (the function as an orifice). The resistance effect can be obtained even when the length L2 of the third flow passage 13 is reduced to a degree. The length L2 is therefore set within the range shown in Equation (4).

Also, even when the length L2 of the third flow passage 13 is relatively shorter than the length L1 of the second flow passage 12, the third flow passage 13 sufficiently provides the aforementioned resistance effect (the function as an orifice).

Thus, the lengths L1 and L2 are set as shown in Equations (5) and (6).

As described above, the inner diameter ID3 of the third flow passage 13 is the smallest in the flow passage 10. Accordingly, a cross-sectional flow area of the flow passage 10 in a plane orthogonal to the flow direction is smallest at the third flow passage 13.

The cross-sectional area of the third flow passage 13 is made the smallest in the flow passage 10, so that the pipe resistance of the flow passage 10 is highest at the third flow passage 13. Accordingly, the static pressure of the liquid inside the second flow passage 12 upstream of the third flow passage 13 is maintained at a high level.

The second flow passage 12 in which the static pressure of the liquid inside is maintained at a high level is formed from the flexible resin material, so that it is elastically deformed when the liquid pulsations further increase the static pressure in the second flow passage 12, thereby suppressing transmission of the liquid pulsations to the downstream.

Thus, the pulsations of the liquid being pumped intermittently from the tube pump 20 can be suppressed by placing the second flow passage 12 formed from the flexible resin material upstream of the third flow passage 13 with the highest pipe resistance in the flow passage 10.

Next, the tube pump 20 of the flow control apparatus 100 will be described.

The tube pump 20 pumps the liquid intermittently from the inlet end 10a toward the outlet end 10b.

Figure 2A:
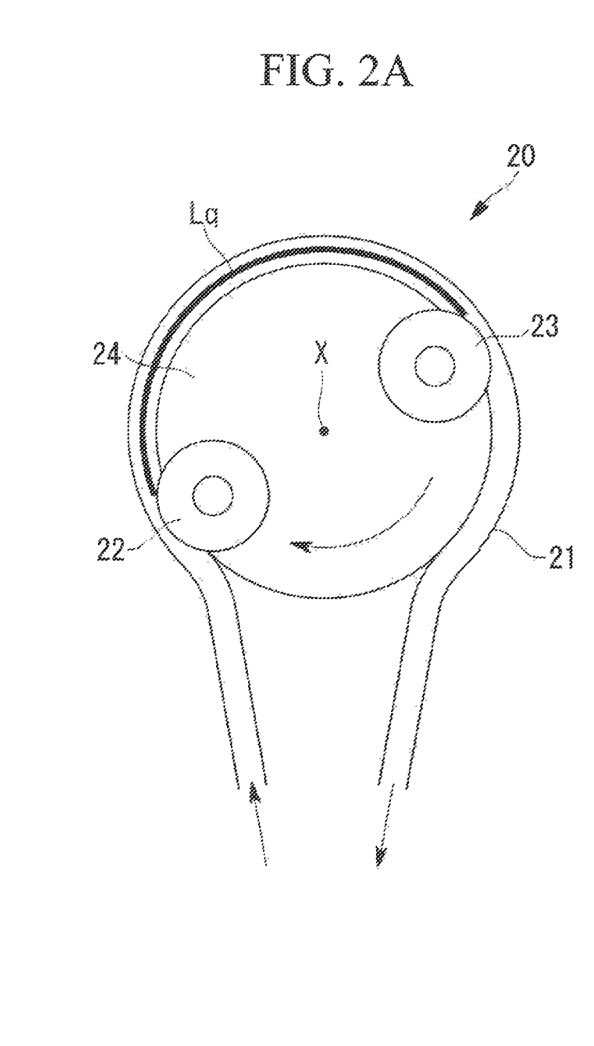
FIG. 2A shows a schematic configuration of a tube pump shown in FIG. 1 illustrating the tube pump pumping liquid at a first time.
Figure 2B:
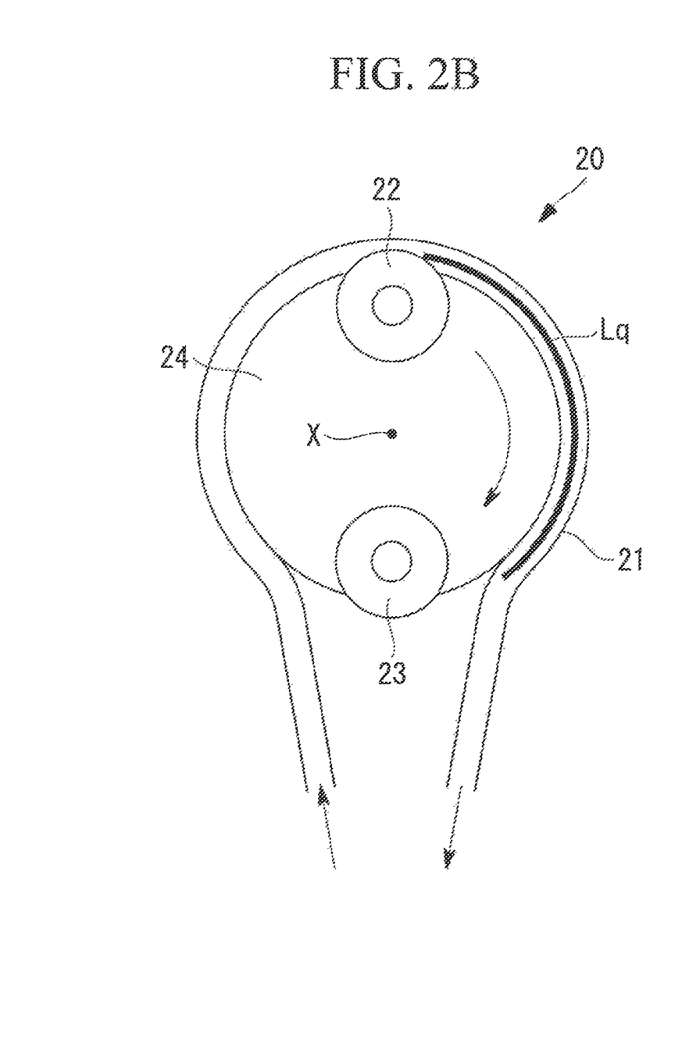
FIG. 2B shows a schematic configuration of a tube pump shown in FIG. 1 illustrating the tube pump pumping liquid at a second time.

As shown in the schematic configuration in FIGS. 2A and 2B, the tube pump 20 has a tube 21 formed from a flexible material such as a silicon resin, rollers 22 and 23, and a rotor 24 to which the rollers are attached.

As shown in FIGS. 2A and 2B, the rotor 24 to which rollers 22 and 23 are attached is turned by a driving force of a motor (not shown) about an axis X in an arrow direction shown in the figure. FIG. 2A illustrates the tube pump pumping liquid Lq at a first time and FIG. 2B illustrates the tube pump pumping the liquid Lq at a second time after a certain period of time from the first time.

As shown in FIGS. 2A and 2B, the tube 21 is intermittently compressed (squeezed) at each point by the rollers 22 and 23 that rotate as the rotor 24 turns. As shown in FIGS. 2A and 2B, the roller 22 positioned at lower left at the first time rotates around the axis X to the highest point at the second time.

Then, the liquid Lq inside the tube 21 moves clockwise in the tube 21 as the roller 22 rotates clockwise around the axis X. The roller 22 and the roller 23 compress the tube 21 intermittently as the rotor 24 turns about the axis X. Thus, the liquid Lq inside the tube 21 is pumped intermittently in the flow direction.

Figure 3:
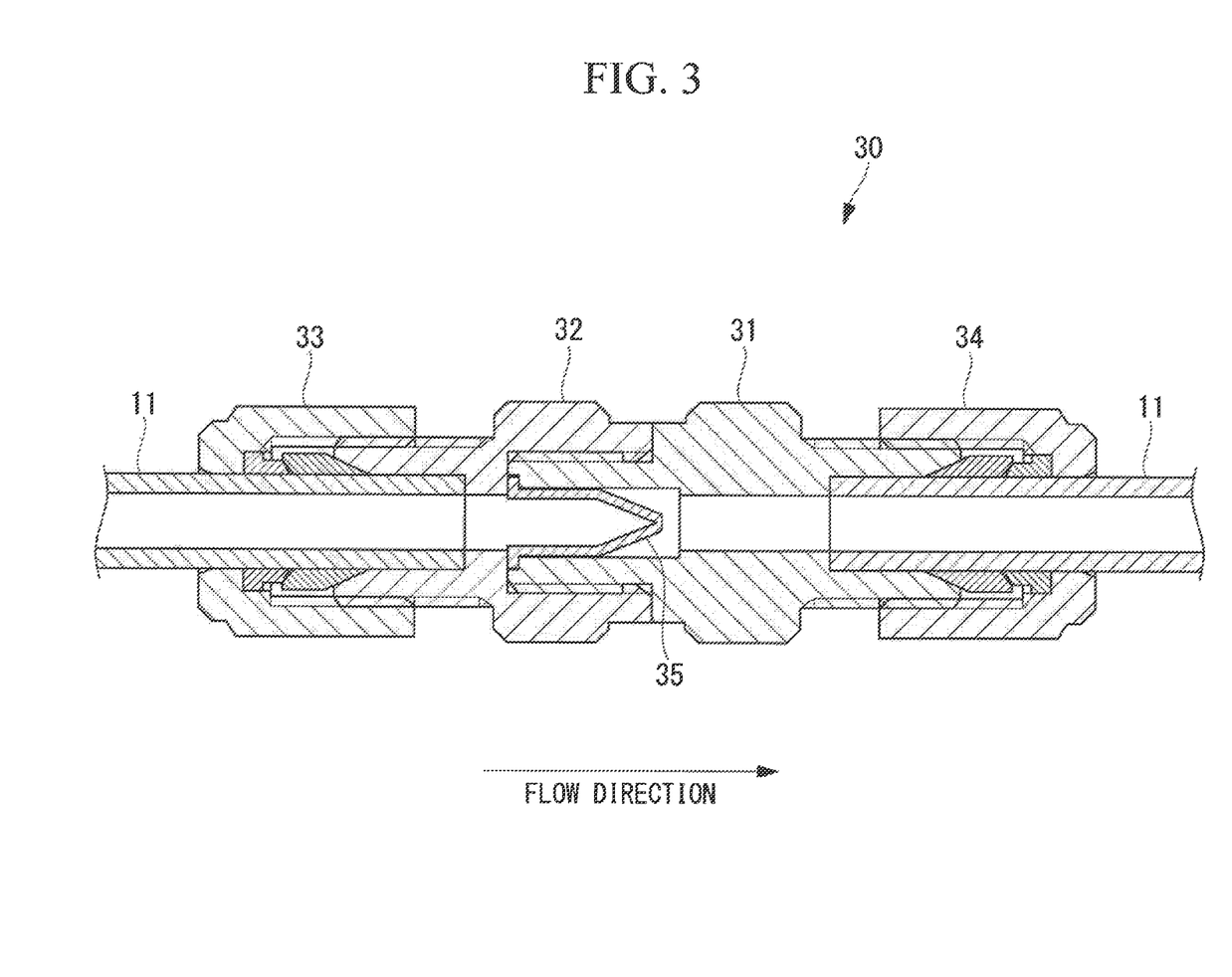
FIG. 3 is a vertical cross-sectional view of a check valve shown in FIG. 1.

As shown in FIG. 3, the check valve 30 includes a bill housing 31, a body 32 attached to the bill housing 31, a nut 33 attached to one end portion of the body 32 in the flow direction, a nut 34 attached to one end portion of the bill housing 31 in the flow direction, and a duckbill 35.

As shown in FIG. 3, the duckbill 35 has a bill shape (a duckbill shape) that is closed at a tip downstream in the flow direction. The duckbill 35 is formed such that a pair of flexible face bodies arranged one above the other abuts against each other at their ends with a slit therebetween. Accordingly, the duckbill 35 allows the liquid to flow in the flow direction, while preventing it from flowing in the reverse direction.

Various flexible materials can be employed as the material of the duckbill 35. For example, ethylene-propylene rubber (EPDM) or fluororubber can be employed.

The duckbill 35 switches the liquid flowing state as it is deformed by the liquid pressure. Accordingly, the duckbill 35 is especially suitable for a flow passage to pass a very small amount of fluid (0.1 cc/min to 30 cc/min) compared with a check valve formed from a mechanical element such as a combination of a valve plug and a spring.

As shown in FIG. 3, the duckbill 35 is accommodated in the bill housing 31 and fixed as it is interposed between the bill housing 31 and the body 32 attached to the bill housing 31.

The first flow passage 11 is fixed in the body 32 by the nut 33 as it is inserted in the body 32. Also, the first flow passage 11 is fixed in the bill housing 31 by the nut 34 as it is inserted in the bill housing 31.

The flow meter 40 is placed downstream of the tube pump 20 in the flow direction and measures the flow rate of the liquid flowing through the flow passage 10. The flow meter 40 may measure the flow rate using a thermal method of heating liquid with a heater and determining the flow rate based on a timing of temperature detection by a temperature detecting element provided downstream of the heater. Alternatively, a differential pressure method of detecting liquid pressures upstream and downstream of an orifice and measuring the flow rate based on the differential pressure may be used, for example.

The flow controller 50 controls liquid output of the tube pump 20 so that the flow rate measured by the flow meter 40 is adjusted to a target flow rate.

As shown in FIG. 1, the flow controller 50 receives the flow rate measured by the flow meter 40. The flow controller 50 transmits a control command value for controlling the rotational speed of the rotor 24 to the tube pump 20 so that the flow rate measured by the flow meter 40 matches the target flow rate set via a setting unit (not shown).

To be specific, when the flow rate measured by the flow meter 40 is lower than the target flow rate, the flow controller 50 transmits a control command value to increase the output of the tube pump 20 to the tube pump 20. On the other hand, when the flow rate measured by the flow meter 40 is higher than the target flow rate, the flow controller 50 transmits a control command value to decrease the output of the tube pump 20 to the tube pump 20.

Next, a description will be given to the liquid flow rate measured by the flow meter 40 of the embodiment.

Figure 4:
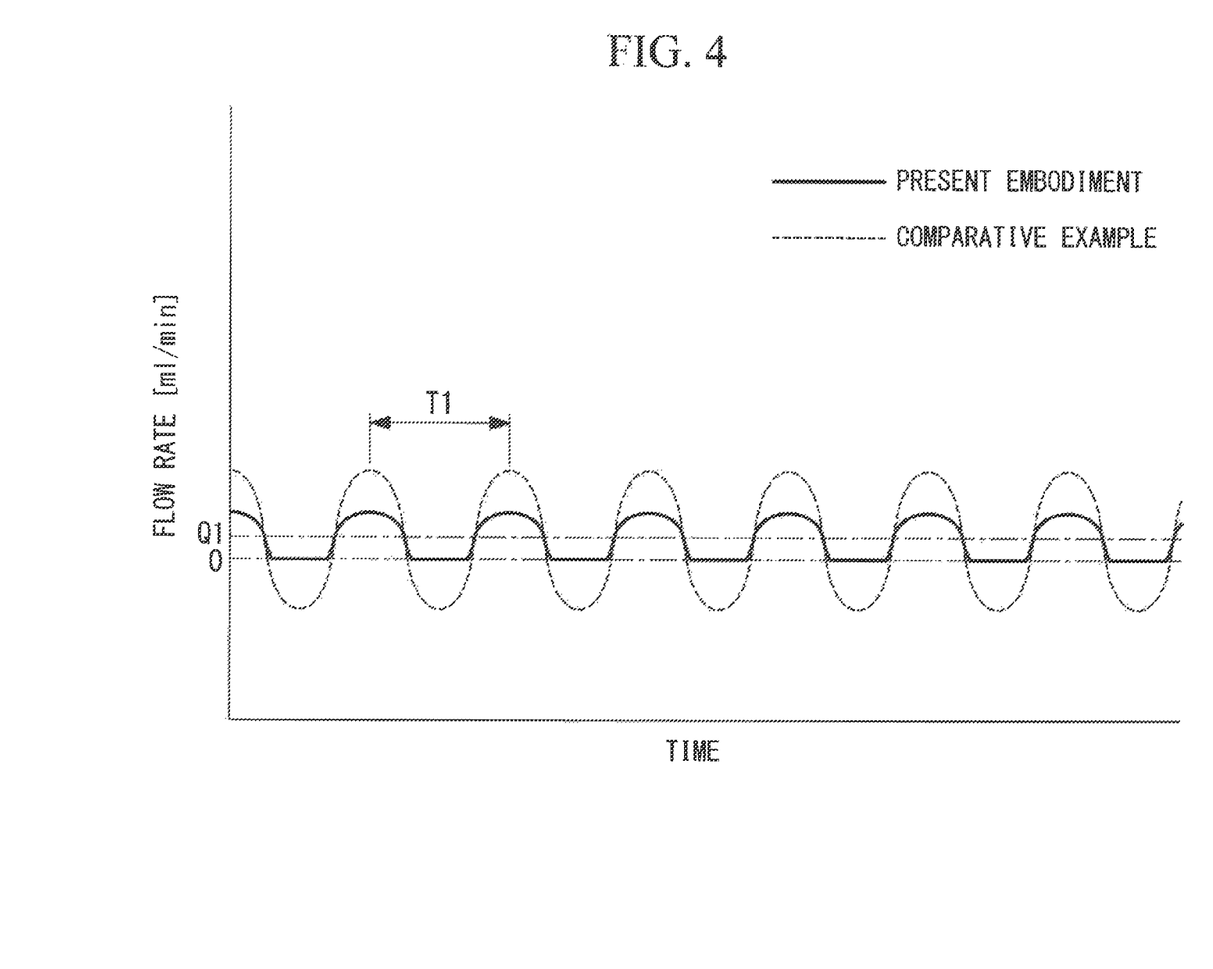
FIG. 4 shows changes over time of the liquid flow rate measured by a flow meter.
Figure 5:
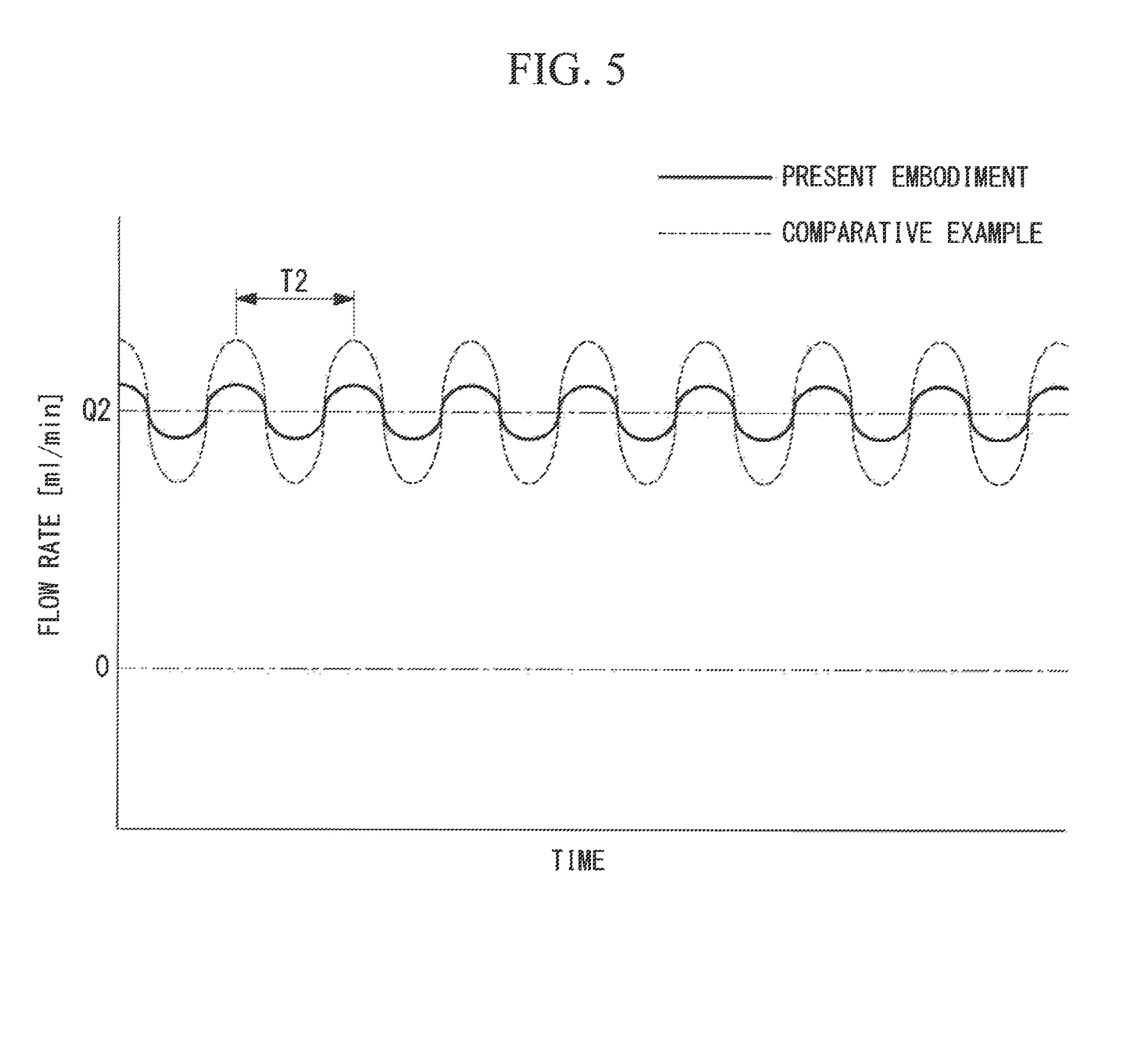
FIG. 5 shows changes over time of the liquid flow rate measured by the flow meter.

FIGS. 4 and 5 both show changes over time of the liquid flow rate measured by the flow meter 40.

FIG. 4 shows a case where the flow rate (output per unit time) of the liquid being pumped by the tube pump 20 is relatively low and has an average value of Q1. On the other hand, FIG. 5 shows a case where the flow rate (output per unit time) of the liquid being pumped by the tube pump 20 is relatively high and has an average value of Q2.

Solid lines in FIGS. 4 and 5 show changes over time of the flow rate measured by the flow meter 40 in the flow control apparatus 100 of the embodiment. Whereas, dashed lines in FIGS. 4 and 5 show changes over time of the flow rate measured by a flow meter in a flow control apparatus of Comparative Example.

Here, the flow control apparatus of the Comparative Example has the same configuration as the flow control apparatus 100 of the embodiment but the second flow passage 12 and the third flow passage 13 have the same inner diameter and the same outer diameter as those of the first flow passage 11 and are formed from the same material as that of the first flow passage 11. That is, the flow passage 10 of the flow control apparatus of the Comparative Example has the same cross-sectional flow area and is formed from the same material throughout itself, from the inlet end 10a to the outlet end 10b.

As shown in FIGS. 4 and 5, fluctuations (pulsations) of the flow rate measured by the flow meter 40 of the embodiment are suppressed compared with those in the Comparative Example (the dashed line). This is because the flow rate fluctuations are absorbed by the elastic deformation of the flexible second flow passage 12.

Also, in the Comparative Example shown in FIG. 4, the flow rate falls below zero at parts of the measurement period due to the flow rate fluctuations of the liquid being pumped by the tube pump 20. The flow rate of below zero indicates that the liquid is flowing in a direction opposite to the flow direction of the liquid from the inlet end 10a to the outlet end 10b. Such an effect is caused when the liquid output of the tube pump 20 is small.

In the embodiment, the flow rate never falls below zero unlike in the Comparative Example, as shown in FIG. 4. The flow rate in the embodiment is zero even when that in the Comparative Example is below zero. This is because the check valve 30 prevents the liquid from flowing in the direction opposite to the flow direction of the liquid.

Thus, the flow control apparatus according to the embodiment suppresses the flow of liquid in the direction opposite to the flow direction of the liquid even when the liquid output of the tube pump 20 is small.

Here, a period T1 of the liquid pulsations in FIG. 4 is longer than a period T2 of the liquid pulsations in FIG. 5. This is because the flow rate of the liquid being pumped by the tube pump 20 is low in FIG. 4 and the rotor 24 of the tube pump 20 turns at a low speed.

A description will be given to the operation and effect of the flow control apparatus 100 of the embodiment described above.

According to the flow control apparatus 100 of the embodiment, the straight tubular second flow passage 12 is placed downstream of the tube pump 20 in the flow direction, and the third flow passage 13 having the smallest cross-sectional flow area in the flow passage 10 is placed downstream of the second flow passage 12. The third flow passage 13 has the highest pipe resistance in the flow passage 10, and accordingly the provision of the third flow passage 13 downstream of the second flow passage 12 reduces the dynamic pressure and increases the static pressure of the liquid flowing through the second flow passage 12 as compared with the case where the third flow passage 13 with the highest pipe resistance is not provided downstream of the second flow passage 12.

According to the flow control apparatus 100 of the embodiment, the straight tubular second flow passage 12 is flexible to be changed in its cross-sectional flow area by the pressure of the liquid. The second flow passage 12, therefore, is elastically deformed when the liquid pulsations further increase the static pressure of the liquid inside the second flow passage 12, thereby suppressing transmission of the liquid pulsations downstream thereof.

Also, according to the flow control apparatus 100 of the embodiment, the straight tubular second flow passage 12 can suppress the liquid pulsations, and thus this eliminates the need for a device having a space for retaining non-flowing liquid such as a damper that has a liquid chamber for suppressing liquid pulsations.

Thus, according to the embodiment, there can be provided the flow control apparatus 100 that can suppress the pulsations of the liquid being pumped intermittently by the tube pump 20 without having any space for retaining non-flowing liquid and control the flow rate appropriately.

The flow control apparatus 100 of the embodiment is provided with the check valve 30 placed downstream of the tube pump 20 in the flow direction. Accordingly, the liquid is prevented from being guided in the direction opposite to the flow direction from the inlet end 10a toward the outlet end 10b even when the liquid being pumped intermittently by the tube pump 20 is pulsating greatly.

In the flow control apparatus 100 of the embodiment, the third flow passage 13 is the straight tubular flow passage in which the cross-sectional flow area in a plane orthogonal to the flow direction is constant. With this configuration, the pipe resistance of the third flow passage 13 can be made the highest in the flow passage 10 by using the straight tubular flow passage with the relatively simple configuration.

In the flow control apparatus 100 of the embodiment, the flow meter 40 is placed downstream of the third flow passage 13 in the flow direction. With this configuration, the liquid whose pulsations are suppressed by the second flow passage 12 placed upstream of the third flow passage 13 and further, reliably suppressed after passing through the third flow passage 13 is supplied to the flow meter 40.

In the flow control apparatus 100 of the embodiment, the check valve 30 is a duckbill check valve. With this configuration, the liquid is appropriately prevented from being guided in the direction opposite to the flow direction from the inlet end 10a toward the outlet end 10b even when the flow rate of liquid being pumped by the tube pump 20 is very low.

Second Embodiment

Figure 6:
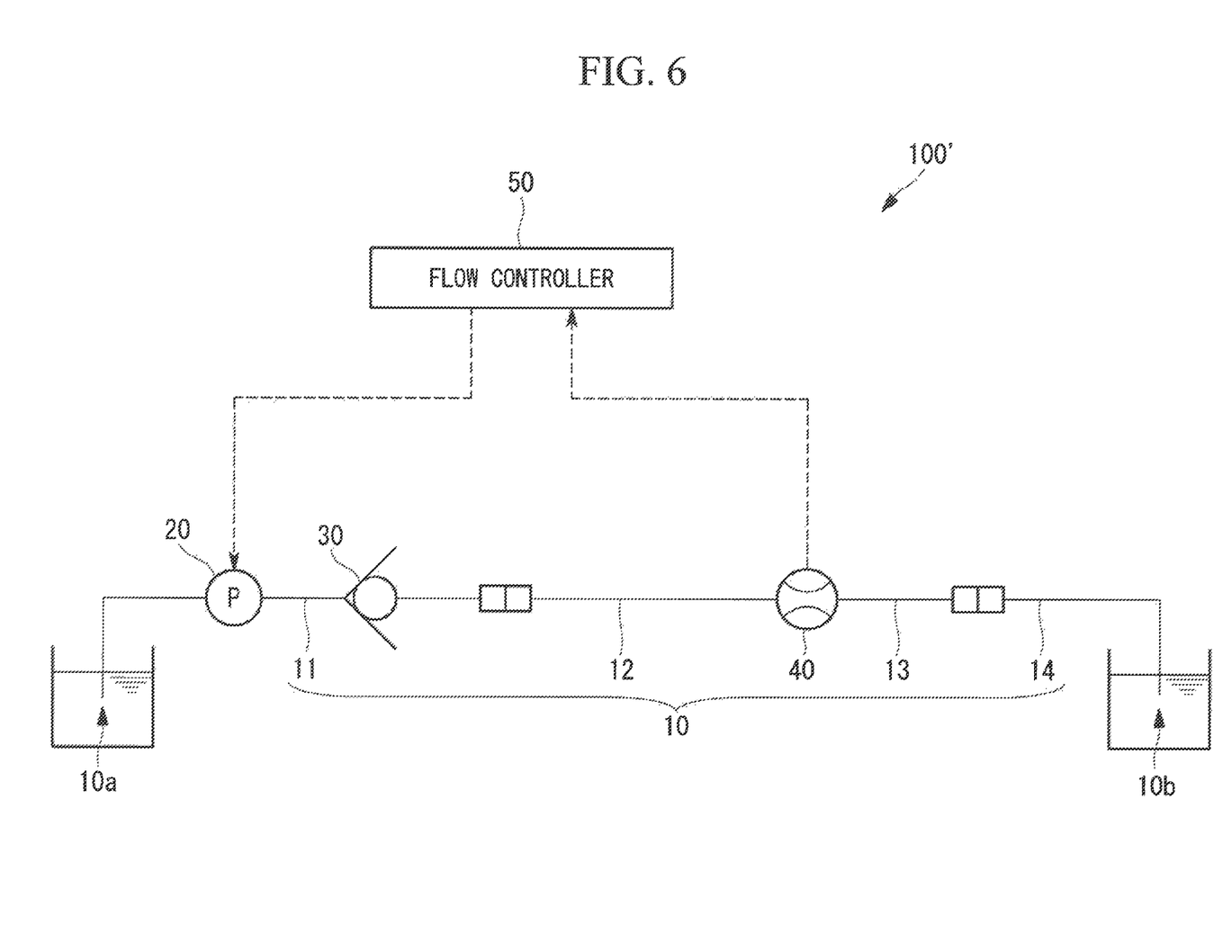
FIG. 6 shows the configuration of a flow control apparatus according to a second embodiment.

Next, a flow control apparatus of a second embodiment of the present disclosure will be described using FIG. 6.

The second embodiment is a modification of the first embodiment, and is similar to the first embodiment unless otherwise described hereinafter.

In the flow control apparatus 100 of the first embodiment, the flow meter 40 is placed downstream of the third flow passage 13 in the flow direction.

To the contrary, in a flow control apparatus 100' of the embodiment, the flow meter 40 is placed upstream of the third flow passage 13 in the flow direction.

Even when the flow meter 40 is placed upstream of the third flow passage 13 in the flow direction as in the embodiment, the liquid pulsations are suppressed by the second flow passage 12 placed upstream of the third flow passage 13. As a result, the flow meter 40 placed downstream of the second flow passage 12 can measure the flow rate of the liquid with the reduced pulsations.

OTHER EMBODIMENTS

The present invention is not limited to the above embodiment, and modifications may be made as appropriate without departing from the scope of the present invention.

Although the cross-sectional flow area of the second flow passage 12 is equal to those of the first flow passage 11 and the fourth flow passage 14 in the foregoing description, they may be configured otherwise.

For example, the cross-sectional flow area of the flow passage 10 in a plane orthogonal to the flow direction may be largest at the second flow passage 12.

This can ensure that a sufficient amount of liquid is accommodated in the second flow passage 12, thereby more reliably suppressing the liquid pulsations.

Although the portion of the flow passage 10 having the highest pipe resistance is formed from the straight tubular third flow passage 13 in the foregoing description, the portion may be configured otherwise.

Figure 7:
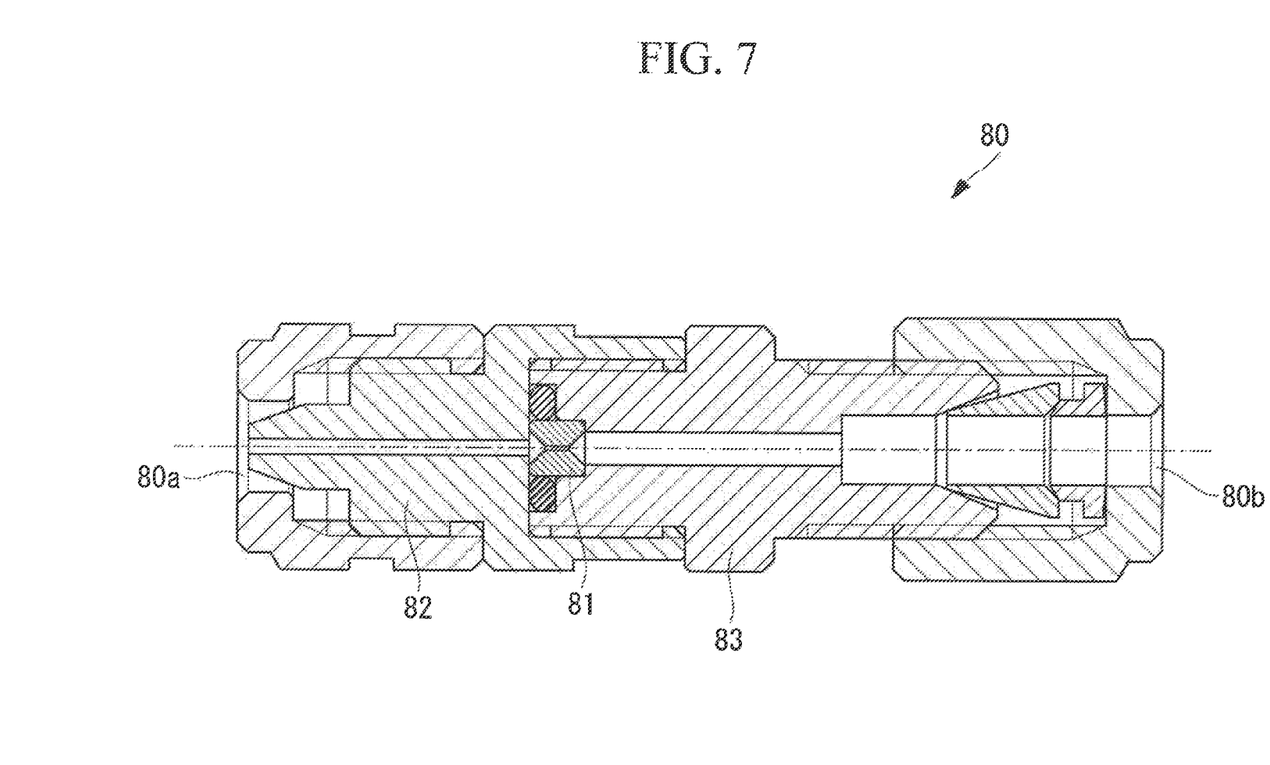
FIG. 7 is a vertical cross-sectional view of an orifice.

For example, an orifice 80 shown in FIG. 7 whose flow path diameter (and cross-sectional flow area) is reduced at a part may be provided instead of the straight tubular third flow passage 13.

The orifice 80 shown in vertical cross-section in FIG. 7 lets the liquid from an inlet 80a exit through an outlet 80b. The orifice 80 includes an orifice portion 81, an inlet-side body 82 through which the liquid from the second flow passage 12 enters, and an outlet-side body 83 in which the orifice portion 81 is installed.

The orifice portion 81 is supported as it is interposed between the inlet-side body 82 and the outlet-side body 83 and forms a reduced diameter portion having a smaller cross-sectional flow area than any other flow passages within the orifice 80.

An inner diameter of the orifice portion 81 (the reduced diameter portion) is set to, for example, 0.2 mm. The value is smaller than an example inner diameter ID3 of the third flow passage 13, 0.5 mm.

The use of the orifice 80 instead of the third flow passage 13 shown in FIG. 1 can make the flow passage shorter than when the third flow passage 13 is used, thereby reducing the dimensions of the overall flow control apparatus 100.

The invention claimed is:

1. A flow control apparatus for controlling a flow rate of liquid being pumped intermittently by a pump, comprising:
 a liquid flow passage extending in a flow direction from an inlet end toward an outlet end, the pump being placed on the liquid flow passage;
 a flow meter placed downstream of the pump in the flow direction, the flow meter measuring a flow rate of liquid passing the liquid flow passage; and
 a flow controller configured to transmit a control signal to increase and/or decrease a liquid output of the pump,
 wherein the liquid flow passage includes:
  a first flow passage on which the pump is placed;
  a second flow passage that is flexible to be elastically deformed by pressure of liquid, the second flow passage being placed downstream of the first flow passage in the flow direction and being straight; and
  a reduced diameter portion at which a cross-sectional flow area of the liquid flow passage in a plane orthogonal to the flow direction is smallest, the reduced diameter portion being placed downstream of the second flow passage in the flow direction,
 wherein the reduced diameter portion is a straight tubular flow passage whose cross-sectional flow area in a plane orthogonal to the flow direction is constant, and
 wherein the pump is a tube pump that pumps liquid in a tube formed from an elastic material by intermittently compressing the tube.

2. The flow control apparatus according to claim 1, further comprising a check valve placed downstream of the pump in the flow direction.

3. The flow control apparatus according to claim 1, wherein the flow meter is placed downstream of the reduced diameter portion in the flow direction.

4. The flow control apparatus according to claim 1, wherein the cross-sectional flow area of the flow passage in a plane orthogonal to the flow direction is largest at the second flow passage.

5. The flow control apparatus according to claim 2, wherein the check valve is a duckbill check valve.

6. A flow control apparatus for controlling a flow rate of liquid being pumped intermittently by a pump, comprising:
 a liquid flow passage extending in a flow direction from an inlet end toward an outlet end, the pump being placed on the liquid flow passage;
 a flow meter placed downstream of the pump in the flow direction, the flow meter measuring a flow rate of liquid passing the liquid flow passage, a liquid output of the pump being increased or decreased based on the measured flow rate; and
 wherein the liquid flow passage includes:
  a first flow passage on which the pump is placed;
  a second flow passage that is flexible to be elastically deformed by pressure of liquid, the second flow passage being placed downstream of the first flow passage in the flow direction and being straight; and
  a reduced diameter portion at which a cross-sectional flow area of the liquid flow passage in a plane orthogonal to the flow direction is smallest, the reduced diameter portion being placed downstream of the second flow passage in the flow direction, wherein the reduced diameter portion is a straight tubular flow passage whose cross-sectional flow area in a plane orthogonal to the flow direction is constant, and wherein the pump is a tube pump that pumps liquid in a tube formed from an elastic material by intermittently compressing the tube.

\* \* \* \* \*